(No Model.)

J. EMERSON.
AIR PIPE COUPLING FOR RAILWAY CARS.

No. 516,481. Patented Mar. 13, 1894.

Witnesses:

Inventor
James Emerson
per Chapin Ley
Attorneys

THE NATIONAL LITHOGRAPHING COMPANY,
WASHINGTON, D. C.

UNITED STATES PATENT OFFICE.

JAMES EMERSON, OF WILLIMANSETT, ASSIGNOR TO HORACE H. STEVENS, OF BOSTON, MASSACHUSETTS.

AIR-PIPE COUPLING FOR RAILWAY-CARS.

SPECIFICATION forming part of Letters Patent No. 516,481, dated March 13, 1894.

Application filed July 13, 1891. Serial No. 399,402. (No model.)

*To all whom it may concern:*

Be it known that I, JAMES EMERSON, a citizen of the United States, residing at Willimansett, in the county of Hampden and State of Massachusetts, have invented new and useful Improvements in Air-Pipe Couplings for Railway-Cars, of which the following is a specification.

This invention relates to improvements in couplings which are more especially designed for forming connections between the air conduits which form part of the brake mechanism or apparatus for railway cars, although the said coupling may be available for connections for the steam or water pipes of the cars.

The object of the invention is to provide couplings of the character indicated which are simple, effective, easy and safe of manipulation in coupling and capable of automatically uncoupling on the separation of the cars.

The invention consists in parts constructed and combined or arranged all substantially as will hereinafter more fully appear and be set forth in the claims.

Figure 1:
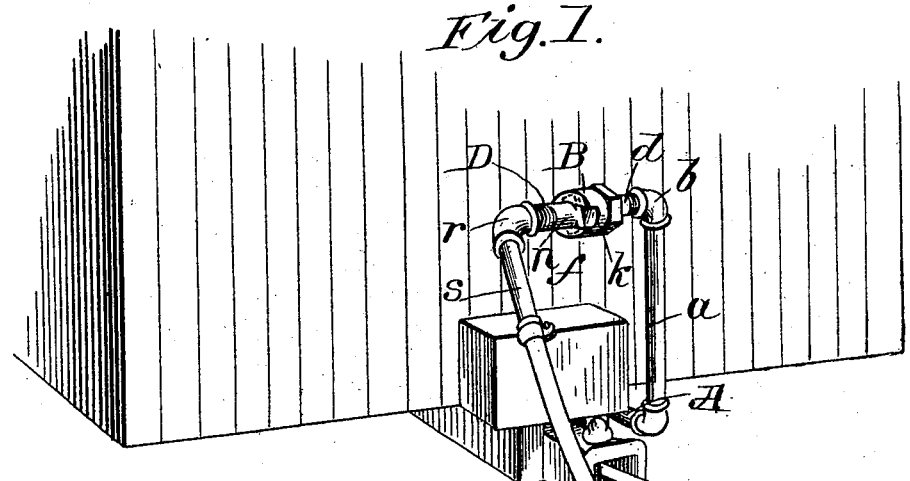
Figure 2:
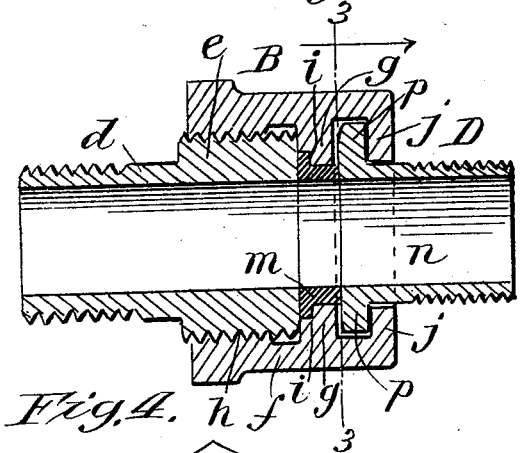
Figure 3:
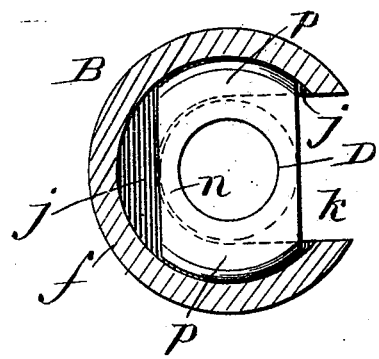
Figure 4:
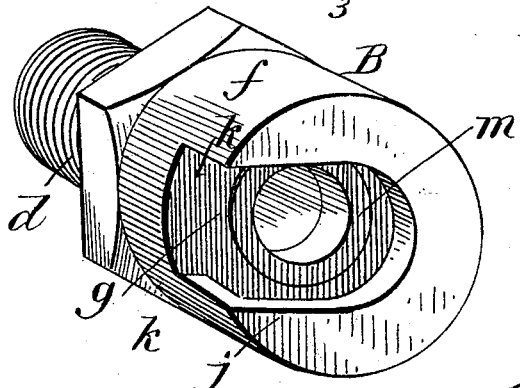
Figure 5:
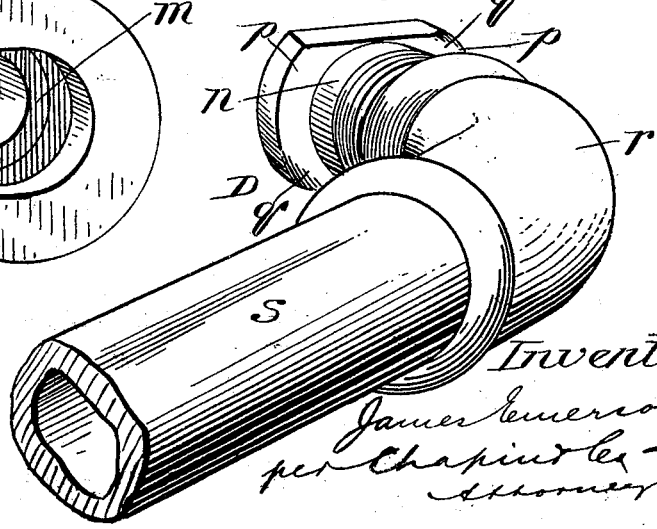

In the accompanying drawings in which the invention is illustrated Figure 1 is a perspective view of the coupling as applied for use on a car. Fig. 2 is an axial section through the coupling. Fig. 3 is a cross section taken on line 3—3, Fig. 2, and Figs. 4 and 5 are perspective views of the coupling-members.

In the drawings, in which similar letters of reference indicate corresponding parts in all the views, A represents the longitudinal air brake conduit which at the end of the car has the upwardly turned section, $a$, with the L coupling, $b$, to which the tubular rigid section, $d$, of the coupling member, B, is connected, and on which such section is supported with the axis transversely of the length of the car. The said coupling member, B, is fully shown at the left portion of Fig. 2, and in Fig. 4 and comprises in addition to the tubular, externally screw threaded shank-section, $d$, which engages said L coupling, $b$, and which shank-section has the enlargement, $e$, which is also externally screw threaded,—the axially apertured cylindrical section, $f$. This latter apertured section has the intermediate internal annular seat-flange, $g$, with the annular rabbet, $i$, in the portion of the border thereof which is toward the section, $d$, and the inner wall of the section is tapped to engage the screw-threaded portion, $h$, of this section, $d$. The circular end wall of said section, $f$, which is at the other end from the place of union of the section, $d$, is provided with the inwardly projecting partial-annular flange, $j$, which has the cut-out, or opening, $k$, in a horizontal line longitudinally of the car. (See Figs. 1, 3 and 4.) The packing ring, $m$, of rubber or other suitable compressible material is fitted within the inner edge of the intermediate annular flange, the said ring having the outwardly extended flange which lies in and engages the said rabbet, $i$, and the said packing ring projects a little beyond the forward face of flange, $g$, as seen in Fig. 2. The other member of the coupling indicated by D, comprises as a part thereof the tubular section, $n$, with the outwardly extended flange portions, $p\ p$, at opposite sides of its extremity. The width of said flanges is about the same as that of the opening, $k$, while the radial extents of the flanges are such that their outer edges are separated by a distance about the same as the internal diameter of the annular wall of the coupling member, B, which lies next within the end flange, $j$. The flanged extremity may thus on being properly presented at one side of the coupling section, B, toward its forward end be slid into position, through the opening, $k$, to be then partially rotated for the engagement with the first described section of the coupling. Of course strain in the direction of the axes of the coupling sections will be resisted by the flange, $j$, engaging the flanges, $p\ p$, and while the section, D, is turned as stated there can be no disengagement by reason of the portions, $n$ and $p$, moving laterally with relation to the axis of the coupling section, B, owing to the convergence of the portions of the said annular wall toward the recess, $k$, whereby said annular wall portions are approached to within a distance less than that between the edges of the flanges, $p\ p$, and all as will be very plain on an inspection of the drawings especially Figs. 3, 4 and 5. The diagonally opposing portions of the said flanged portions, $p\ p$, are reduced as indicated at $q$, Fig. 5, so as to constitute slight cams. The coupling section, D, further comprises, or has, an auxiliary L-coupling, r with which the section, n, has a screw engagement and with which the hollow rigid section, s, has a screw engagement. With the latter section, s, the hose or flexible conduit, t, is connected which, it is understood also connects with the main air-conduit of the other car; and when the coupling members are connected the hose hangs as a loop between the cars. Should the cars draw apart and the hose assume a horizontal relation, the part, s,—angularly extended with relation to the part, n—acts as a crank arm to partially rotate the said part, n, to bring the flanges, p p in line with the opening, g, in coupling member, B, when the coupling section, D, moving away from the one B in the line of travel of the car automatically effects the uncoupling. The packing, m, on becoming worn may be compressed by screwing up the sections, d—f the one upon the other when the extent of the annular projecting portion of the packing ring outside of the face of the flange, g, may be increased. Or on separating the said sections the packing-ring may be replaced by a fresh one.

I claim—

1. The combination with the coupling member, B, consisting of the tubular section, d externally screw threaded as at h and the hollow cylindrical section, f, internally screw threaded at one end portion, and having the intermediate internal annular flange, g, with the rabbet, i, and the end flange, j with the opening, k, and the flanged packing-ring, m, of the tubular member having on its coupling end at opposite sides the outwardly extended flanges, p p substantially as described.

2. The combination with the air or other conduit of one car having connected thereto a passaged coupling member which has its head of cylindrical form with an inwardly extended partially annular flange, j, with the opening or cut-out, the said member being supported axially transversely of the car with the said cut-out portion forwardly presented and longitudinally of the car, of the other passaged coupling member for the other car comprising a tubular section with outward flanges p p at opposite sides and the rigidly connected tubular angular section and the flexible conduit, all arranged to be coupled and automatically uncoupled on the separation of the cars substantially as described.

JAMES EMERSON.

Witnesses:
WM. S. BELLOWS,
J. D. GARFIELD.